No. 726,279. PATENTED APR. 28, 1903.
L. GIACOMINI.
PROCESS OF ROASTING COFFEE.
APPLICATION FILED JUNE 21, 1902.

NO MODEL.

WITNESSES:
Walter Wollheim
Glenn H. Niles

INVENTOR
Luigi Giacomini
BY
Goepel & Niles,
ATTORNEYS.

THE NORRIS PETERS CO., PHOTO-LITHO., WASHINGTON, D. C.

UNITED STATES PATENT OFFICE.

LUIGI GIACOMINI, OF FLORENCE, ITALY.

PROCESS OF ROASTING COFFEE.

SPECIFICATION forming part of Letters Patent No. 726,279, dated April 28, 1903.

Application filed June 21, 1902. Serial No. 112,695. (No specimens.)

*To all whom it may concern:*

Be it known that I, LUIGI GIACOMINI, a citizen of the Kingdom of Italy, residing in Florence, Italy, have invented certain new and useful Improvements in Processes of Roasting Coffee, of which the following is a specification.

This invention relates to an improved process of roasting coffee which is based on the utilization of the aromatic essences and essential oil contained in the coffee-bean, which heretofore were carried off during the roasting, by regaining the said essences and oil in condensed liquid form and reintroducing them into the coffee after the roasting process is completed, thereby obtaining a coffee containing all the aromatic ingredients of the coffee-bean. The process can also be employed for making cereal coffees and coffee substitutes.

For this purpose the invention consists in a process of roasting coffee comprising the steps of conducting off the essential oil and aromatic essences during the roasting process, condensing the same into liquid form, subjecting the roasted beans to a cooling process, and incorporating some of the condensed liquid essence with the cooled beans, as will be fully described hereinafter and finally pointed out in the claim.

Figure 1:
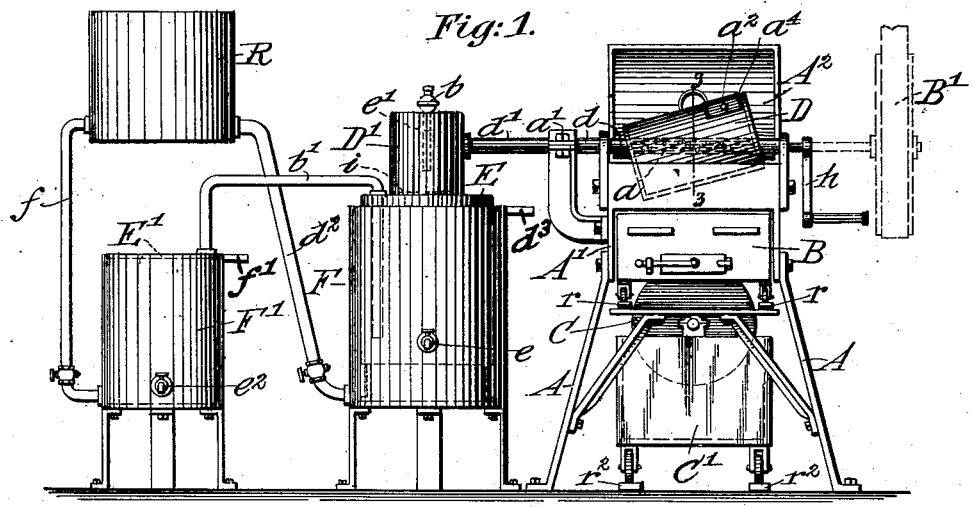
Figure 2:
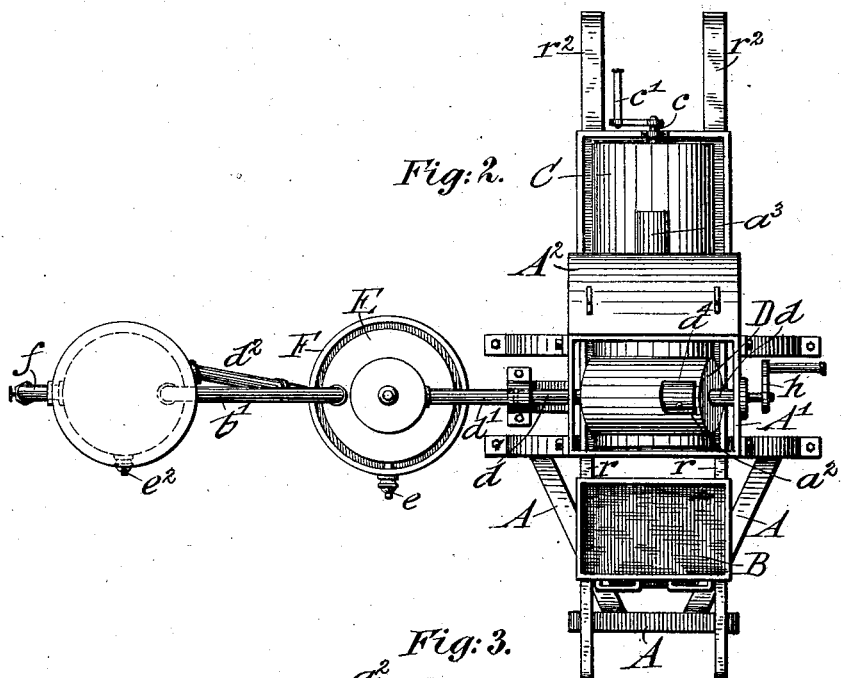
Figure 3:
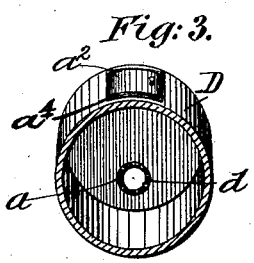

In the accompanying drawings, Figure 1 is a side elevation of one form of apparatus for carrying out my improved process of roasting coffee. Fig. 2 is a plan view of the same;
and Fig. 3 is a vertical section on line 3 3, Fig. 1.

Similar letters of reference indicate corresponding parts.

In carrying out my improved process of roasting coffee the beans in a green state are placed in a drum, which is slowly rotated and subjected to the action of a furnace.

A indicates the supporting-frame for the drum and furnace. The drum D is located within a suitable casing A', open at the bottom and provided with a hinged lid or cover A². A tubular shaft $d$, to which a crank and handle $h$ are attached, passes through the drum and casing. The drum is arranged on the shaft $d$ in tilted position, so as to well agitate the beans when turned. Within the drum the shaft is provided with perforations $a$, through which the vapors from the beans pass off, being then conducted off through the shaft and a pipe $d'$, connected by a suitable coupling at $a'$ with the same and which leads to a cover $D'$ of a condenser E, as shown in Figs. 1 and 2. The volatile substances pass from the cover $D'$ into the condenser E, which is cooled by running water that is supplied through a valved pipe $d^2$, that connects a reservoir R with the lower part of a water-jacket F, surrounding the condenser E. The cooling-water is conducted away by a pipe $d^3$. The vapors are condensed by the cooling action of the water in the jacket and are collected in the bottom of the condenser, from which they can be drawn at will by means of a faucet $e$, while the steam and other vapors not condensing in E escape through a pipe $e'$ in the cover $D'$, which pipe is provided with a whistle $b$. During the first part of the roasting process the pressure is low, and consequently the whistle is not sounded, while as the roasting process proceeds the pressure of the vapors increases, and gradually the whistle is more and more loudly sounded, indicating thereby that the roasting process is approaching its completion, the whistle acting thereby as an alarm, indicating that the roasting is completed and that the furnace B below the drum should be withdrawn and the rotary motion of the drum stopped. The cover $D'$ of the condenser is provided at its lower portion with a screen $i$, so as to collect in the cover the fine coffee-shells that are carried off with the vapors and prevent them from being carried into the condenser with the volatile substances. The greater part of the uncondensed vapors pass over by a pipe $b'$ into a second condenser E', provided with a water-jacket F', supplied by a valved pipe $f$ from the reservoir R and having a discharge-pipe $f'$. The liquid oils and essences condensing in E' are drawn off when desired by a faucet $e^2$.

$a^3$ is a chimney projecting from the upper portion of the cover A² of the casing A' for permitting the exit of the gases of the products of combustion from the furnace B.

During the roasting process the furnace B is located in position below the roasting-drum and the same thereby heated. As soon as the roasting is completed the furnace is rolled out from the casing A' upon the horizontal rails r. A second drum C for cooling the beans is then moved with its wheeled casing C' into position below the roasting-drum D, the door $a^2$ of which is then opened and the drum turned into position so as to discharge the beans into the cooling-drum, which is provided with a similar door, as shown in the drawings. A quantity of the condensed coffee essence, more or less, as desired, from the condensers E E', to which a small quantity of brown sugar diluted with water may be added, is then scattered over the roasted coffee-beans in the cooling-drum, the door of the drum closed, and the latter rotated by means of the hand-crank $c'$. The beans are thereby thoroughly agitated, and the thorough absorption of the essence by the beans during the cooling of the same is produced. By this treatment the coffee-beans quickly cool, and the escape of the volatile essence is prevented, the same being all absorbed by the beans. The object of adding the brown-sugar solution is to produce a coating on the surface of the coffee-beans, and thereby prevent the escape of the aromatic oils and essences from the beans.

When coffee substitutes are made from roasted wheat, barley, or other cereal substances, the cereals are first roasted in the roasting-drum and then transferred into the cooling-drum and there mixed with the coffee essence and the solution of brown sugar, so as to produce thereby a coffee substitute having all the flavors of the coffee-bean. During the roasting of the cereals the hollow shaft $d'$ is disconnected from the drum, so that the vapors can pass off directly into the outside air. Any quantity of the coffee essence and solution of sugar may be added to the roasted beans or cereals, according to the strength desired; but in practice it has been shown that about one thirty-second of a liter of the essence is sufficient for each kilogram of roasted coffee and about one-twentieth of a liter for roasted wheat or other cereal to be used as a coffee substitute.

My improved process of roasting coffee has the following advantages: First, there is less loss in weight than by the ordinary method of roasting; second, that the beans have a better aroma and strength, whereby is produced a more aromatic flavor from a definite quantity of coffee-beans; third, it imparts to an inferior coffee a better aroma, as it returns the flavors of the beans, which heretofore have passed off during the roasting process; fourth, it permits the manufacture of cereal coffee into coffee substitutes having the volatile substances of the coffee-bean.

Having thus described my invention, I claim as new and desire to secure by Letters Patent—

The process herein described of roasting coffee, which consists in subjecting the coffee-beans to a roasting heat until entirely roasted, conducting off and condensing into liquid form the volatile substances arising from said beans during the roasting, mixing with the resulting liquid of condensation a suitable quantity of sugar so as to form a sugar solution, discontinuing the roasting heat from the beans, adding to said entirely-roasted and non-coated beans while still in heated condition a quantity of said sugar solution, and then simultaneously cooling and agitating said beans and sugar solution in contact with each other until arrived at ordinary temperature, substantially as set forth.

In testimony that I claim the foregoing as my invention I have signed my name in presence of two subscribing witnesses.

LUIGI GIACOMINI.

Witnesses:
GRASTI FRILLI,
SPIRITO BERNARDI.